G. M. KING.
PLANT AND FLOWER POT.
APPLICATION FILED JULY 28, 1909.
986,395.
Patented Mar. 7, 1911.
2 SHEETS—SHEET 1.
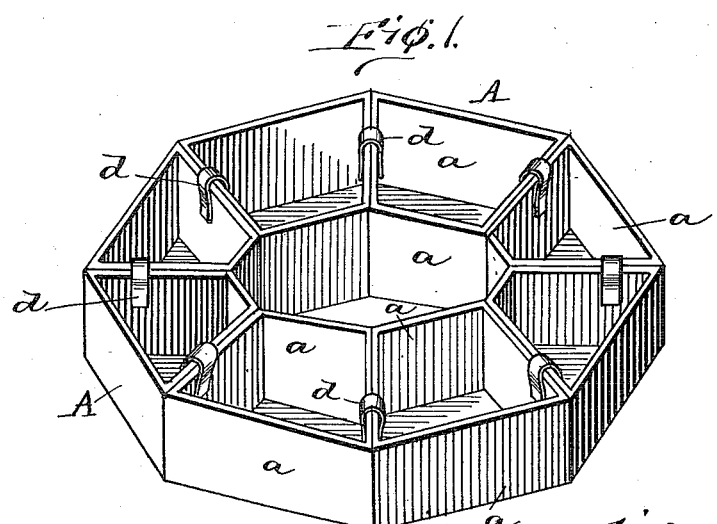
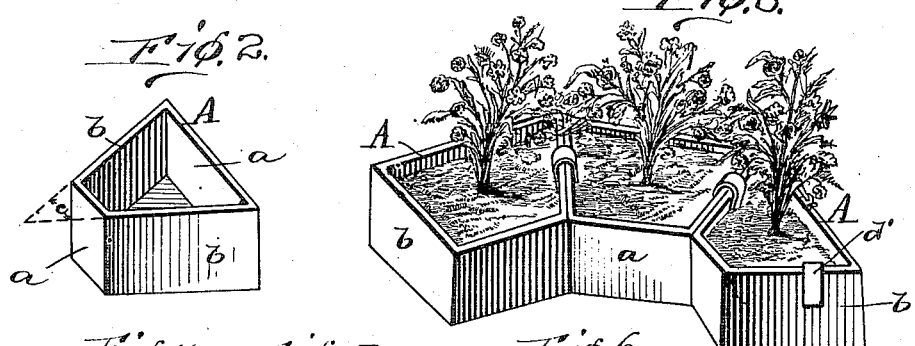
Witnesses
Inventor:
Gertrude M. King
by
her Attorney.

G. M. KING.
PLANT AND FLOWER POT.
APPLICATION FILED JULY 28, 1909.
986,395.
Patented Mar. 7, 1911.
2 SHEETS—SHEET 2.
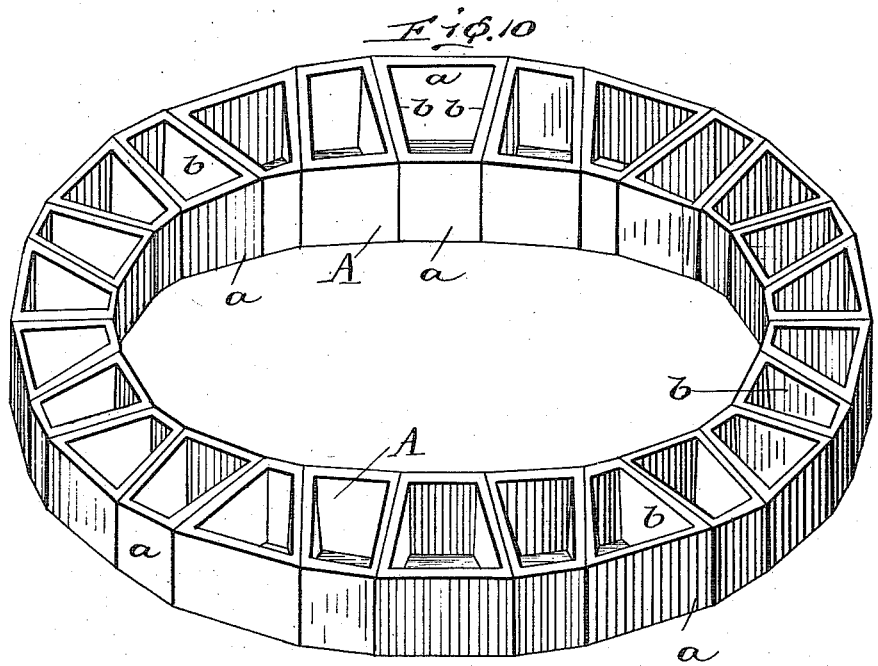
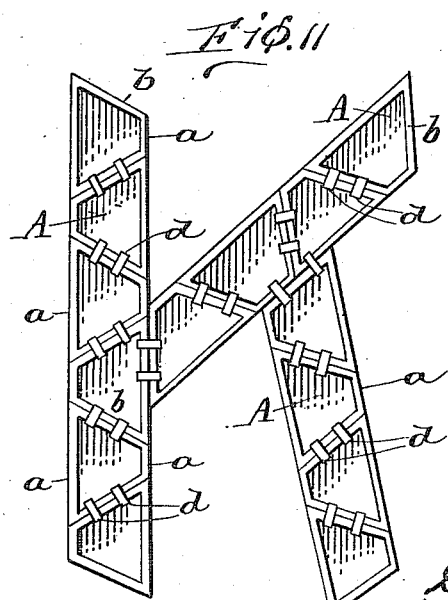
Witnesses
J. M. Fowler Jr.
E. O. Hildebrand
Inventor:
Gertrude M. King
By
her Attorney.

UNITED STATES PATENT OFFICE.

GERTRUDE M. KING, OF NANTUCKET, MASSACHUSETTS.

PLANT AND FLOWER POT.

986,395.

Specification of Letters Patent. Patented Mar. 7, 1911.

Application filed July 28, 1909. Serial No. 510,151.

*To all whom it may concern:*

Be it known that I, GERTRUDE M. KING, citizen of the United States, residing at Nantucket, in the county of Nantucket, State of Massachusetts, have invented certain new and useful Improvements in Plant and Flower Pots; and I do hereby declare the following to be a full, clear, and exact description of the invention, such as will enable others skilled in the art to which it appertains to make and use the same.

This invention relates to receptacles for plants or flowers, its object being to arrange or construct receptacles of this character in such a way as to be able to form with them different and varying designs and to arrange them generally for ornamental and decorative purposes.

The invention consists in a series of receptacles removably connected with each other and forming a composite holder of any desired design. Each individual receptacle or unit forming part of the composite receptacle is, for this purpose, formed with two of its opposite vertical sides forming an angle with each other, which angle, in some instances, may be an aliquot part of the circumference of a circle. The connections between the individual receptacles or units are made removable or separable for the purpose of being able to arrange these receptacles in any desired manner and then to quickly connect them, and also for the purpose of easy separation and transportation when the composite receptacle has served its purpose.

In the accompanying drawing I have represented what I consider the preferred manner of carrying out my invention.

In this drawing: Figure 1 represents in isometric perspective a composite receptacle for flowers arranged to form an annular or circular design; Fig. 2 represents a similar view of one of the individual receptacles or units thereof; Fig. 3 represents a similar view of several receptacle units removably connected; Fig. 4 represents a detailed view thereof in vertical section; Figs. 5, 6, 7 and 8 and 8ª represent detail views showing different forms of separable connections to be employed in connection with my invention; Fig. 9 represents a plan view of two receptacle units combined to form a center piece for a table; Fig. 10, represents still another mode of combining the receptacle units to form an annular design; and Fig. 11 a plan view of another composite plant receptacle forming still another design.

By referring to the drawing it will be noted that the composite plant receptacle under my invention is made up of a number of receptacle units A which may be flower pots or plant boxes or boxes for cut flowers. These receptacle units are in the form of a quadrangular box which may be of any material such as metal, wood or earthenware. These receptacle units have their four sides vertical, two opposite sides $a, a$, being parallel to each other and the remaining two sides $b, b$, being inclined with respect to each other. In some cases it is of advantage to make the angle $c$ inclosed by the two opposite sides an aliquot part of 360 degrees, say for example, 45°, and make the said opposite sides equal to each other. In this case the boxes may be arranged as in Fig. 1 so as to form a completely annular composite plant receptacle.

In order to retain the units of the composite plant receptacle in position with regard to each other, I provide removable or separable connecting devices such as the removable spring clamps or clips $d$ shown in Figs. 1, 8, 8ª, 9, and 11. However, I may use other forms of separable connecting devices such as the spring clips $d'$ represented in Figs. 3, 4, 6 and 7, said clips consisting of spring tongues having free ends $d^3$ and being secured at their other ends to one of the receptacle units or boxes at $d^4$, as shown in Figs. 3 and 4. Preferably the arms of these clips, both the free arm and the arm 2 which is secured to the box, fit into mortises in the sides of the boxes, as shown in Figs. 6 and 7. Or the removable connecting devices may consist of a nut and bolt connection $d^6$, as shown in Fig. 5 or of a circular metal spring staple or clamp $d^7$ of heavy round wire, for example, engaging or fitting into corresponding cylindrical mortises or recesses $d^8$, on the interior of adjoining sides of adjoining boxes. This construction is shown in Figs. 8, 8ª and 9. As shown in these figures, the mortises, $d^8$, are preferably, though not necessarily, open or, in other words, have a cross section somewhat more than a semicircle but less than an entire circle, the open portion or slot formed being toward the interior of the box. These mortises are so formed as to weaken the sides of the box as little as possible consistent with clamps or staples of sufficient cross section to securely hold the boxes together. When using the clamping devices represented in Figs. 6, 7, 8 and 8ᵃ, the necessary mortises for receiving the spring clamps may be formed on the interior of several or on all of the sides of each box, for the purpose of ready interchangeability and grouping, these mortises reaching down from the top edges of these sides a sufficient distance, as shown, to receive clamp arms of sufficient length to properly hold the boxes together. A number of such mortises may also be used on one or all the sides of a box, as shown in Fig. 9. By such arrangement a number of spring staples or clamps may be used on the adjoining sides, the clamping action being thereby increased. A number of removable connecting or clamping devices on each pair of adjoining sides is also shown in the composite receptacle represented in Fig. 11.

The receptacle units A may serve as flower pots or boxes for living plants, or as receptacles within which flower pots may be placed, or in some cases they may serve as receptacles for cut flowers to be used for various decorative purposes as will be readily understood.

The advantage flowing from this invention is that, with the receptacle of simple shape and readily made, I am enabled to form a great variety of designs, and at the same time I may change such designs at will with very little expenditure of labor. Moreover, by the use of the spring clamps, and in particular the spring clamps shown in Figs. 8 to 9 in connection with the corresponding mortises, I may combine an effective connecting device with extreme simplicity of construction; a connecting device, moreover, which may be readily applied or adapted to any portion of the sides of the boxes and thus allow of a great variety of grouping.

It will be noted from the drawing that all four sides, the inclined sides $a$ as well as the parallel sides $b$, of the flower receptacle units under my invention are flat or plane surfaces and are vertical. By this construction it is possible to produce an almost unlimited variety of designs, because in so doing I can place not only an inclined side $b$, of one unit in contact with an inclined side of another unit, as in Figs. 1 and 10, but also an inclined side $b$ in contact with one of the parallel sides, $a$, where necessary to form the design, as in Fig. 11, or also one of the parallel sides of one unit in contact with a parallel side of another unit, as in Fig. 9.

What I claim and desire to secure by Letters Patent is:—

1. A composite receptacle or holder for flowers or plants, comprising a plurality of receptacles each having four vertical sides, two opposite sides of which are flat and inclined with respect to each other, and two other sides being parallel, in combination with removable means for connecting said receptacles.

2. A composite receptacle or holder for flowers, comprising adjoining boxes having vertical sides and a mortise being formed in one of the adjoining sides, in combination, with a clamp removably connecting said boxes and having a tongue engaging said mortise.

3. A composite receptacle or holder for flowers, comprising adjoining boxes mortised at their adjoining sides, in combination, with clamps for connecting the adjoining sides, the free ends of said clamps engaging said mortises.

In testimony whereof I hereunto affix my signature in the presence of two witnesses.

GERTRUDE M. KING.

Witnesses:
ELLEN M. ROUND,
EMMA COOK.